United States Patent [19]

Huggett

[11] 3,827,362

[45] Aug. 6, 1974

[54] ELECTRICAL CIRCUIT DESTRUCT SYSTEM

[75] Inventor: Clayton M. Huggett, Burke, Va.

[73] Assignee: The United States of America as represented by the Secretary of the Navy, Washington, D.C.

[22] Filed: Aug. 14, 1972

[21] Appl. No.: 282,084

[52] U.S. Cl. .................................. 102/90, 174/68.5
[51] Int. Cl. ............................................. H04k 1/00
[58] Field of Search ........... 102/6, 90; 174/52, 68.5; 147/14, 15, 16

[56] References Cited

UNITED STATES PATENTS

| | | | |
|---|---|---|---|
| 3,394,218 | 7/1968 | Foudriat | 174/68.5 |
| 3,565,706 | 2/1971 | Waite | 102/6 |
| 3,638,573 | 2/1972 | Campbell | 149/14 X |
| 3,666,967 | 5/1972 | Keister et al. | 174/68.5 |
| 3,695,951 | 10/1972 | Helms et al. | 149/44 |
| 3,697,668 | 10/1972 | Campbell | 174/68.5 |

*Primary Examiner*—Samuel Feinberg
*Assistant Examiner*—H. J. Tudor
*Attorney, Agent, or Firm*—Richard S. Sciascia; J. M. St. Amand

[57] ABSTRACT

A system for destroying critical electrical circuitry within a pressurized container, without creating hazards to surrounding apparatus and personnel, utilizing active metals and the pressurizing gas as a reactant.

8 Claims, 1 Drawing Figure

ELECTRICAL CIRCUIT DESTRUCT SYSTEM

BACKGROUND OF THE INVENTION

The present invention relates to destruct systems for electrical circuitry and the like, and particularly to destruct means for non-catastrophic anti-compromise destruct applications.

A need exists for destroying electrical circuitry and other critical circuit components within a confined space without creating hazards to surrounding apparatus and personnel. Many electrical circuit components are sealed in lightweight metal containers and then normally pressurized to a pressure slightly above atmospheric or about 19 psia. Common pyrotechnic devices which are used in such systems for destruct purposes generate gas and heat which may increase the pressure within the container for the device causing the container to rupture or explode, spreading fire and fragments, and creating hazardous conditions in the surroundings.

SUMMARY OF THE INVENTION

This invention, through the use of condensed phase reaction products, provides the necessary means to reduce or eliminate to a large degree the gaseous products produced within the pressurized containers of electrical circuit components. The destruct reactant materials are used adjacent to electronic components and assemblies within their pressurized containers. The dielectric gas which is used for pressurizing the circuit containers is one of the reactants in the destruct system and is converted into a liquid or a solid product upon destruct initiation, thus reducing the rise in pressure in the container while simultaneously releasing large amounts of energy for destroying the contents.

STATEMENT OF THE OBJECTS OF THE INVENTION

It is an object of the invention, therefore, to provide a non-hazardous destruct system for electronic components.

Another object is to provide an electrical circuit destruct means for sealed and pressurized circuit components.

Other objects, advantages and novel features of the invention will become apparent from the following detailed description of the invention when considered in conjunction with the accompanying drawing wherein:

BRIEF DESCRIPTION OF THE DRAWING

The FIGURE of drawing shows a cross-sectional plan view of an embodiment of the invention.

DESCRIPTION OF THE PREFERRED EMBODIMENT

Figure 1:
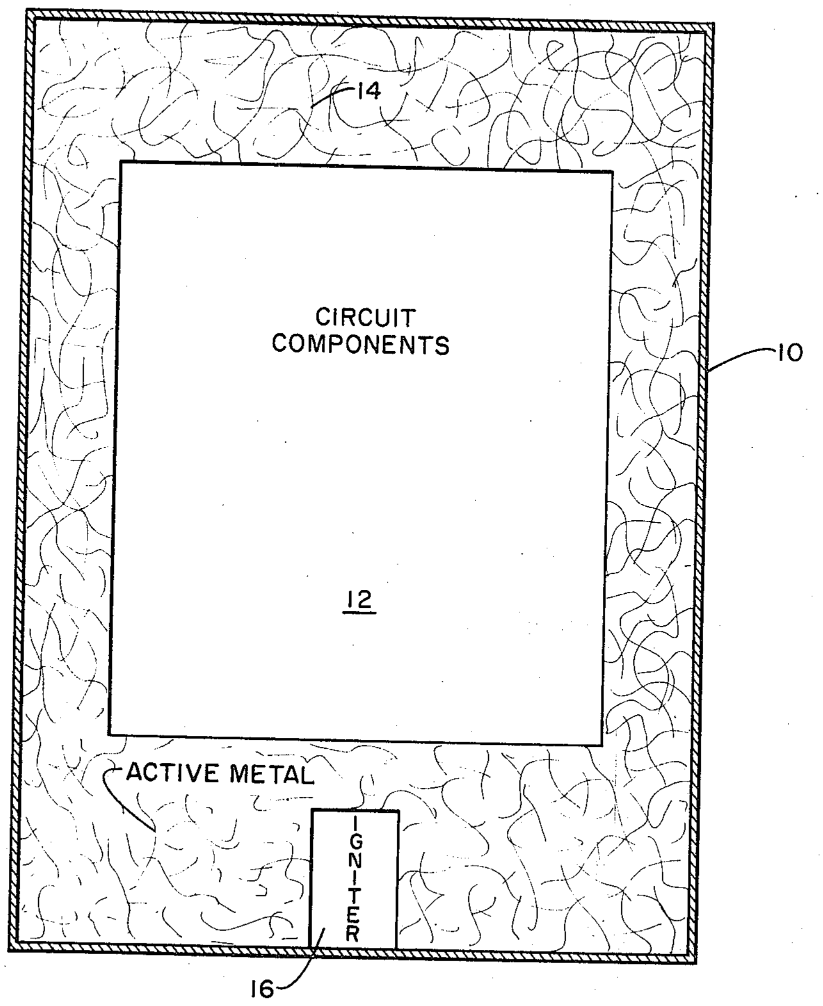

In the present invention a container 10, operable to be pressurized with a dielectric gas, houses critical circuit components 12, as shown in the drawing. Circuit components 12 are suitably spaced from the inner walls of container 10. An active metal 14, in a form which presents a large surface area, surrounds the circuit components 12 and is positioned in the space between the circuit components and the inner walls of container 10. An igniter 16 is also housed within container 10 and is also substantially surrounded by active metal 14, as shown.

The dielectric low molecular fluorocarbon gas used in pressurizing the container 10 which houses electronic circuit 12 is used as one of the reactants in the destruct reaction system. Upon destruct initiation when igniter 16 is initiated, the gas in the container reacting with active metal 14 is converted into a solid or liquid product, thus reducing the rise in the pressure in the container, while simultaneously releasing large amounts of energy which help to destroy the circuit contents. Energy transfer from the reaction products to the electronic components within the container is particularly efficient in the case of condensed phase reaction products.

Gases which are suitable as reactants with the active metal 14 in the destruct system within the container 10 include low molecular fluorocarbons, such as $CF_4$, $C_2F_6$, $C_3F_8$, $C_4F_{10}$, $C_4F_8$, $C_6F_{12}$ and $CF_6$. Suitable co-reactants for the gas are active metals such as magnesium and aluminum in a form which presents a large surface area, such as powder, foil, wire, wool, sponge, etc. Active metal 14 is shown in a metal wool form, in FIG. 1.

The flourinated gases are highly stable and are good dielectrics. These gases are suitable for pressurizing electronic equipment containers since they have very low toxicity and leakage would present no hazard. The ignition temperatures required to react the flourinated gases with Mg are about 800°C. A squib or hot wire type igniter 16 can be used to initiate the reaction. Other suitable igniters can also be used.

The products of reaction of the fluorocarbons in the gas with magnesium are $MgF_2$ and C. When reacting $C_4F_8$ gas with magnesium at 25°C and 19 psia pressure, there is a heat release of 36 Kcal/liter.

The reaction of the fluorocarbons with aluminum will produce $AlF_3$ and C.

The destruct system of this invention can be used in combination with other pyrotechnic destruct systems to increase the thermal output of those systems while minimizing gas evolution and pressure rise which create hazards.

Obviously, many modifications and variations of the present invention are possible in the light of the above teachings. It is therefore to be understood that within the scope of the appended claims the invention may be practiced otherwise than as specifically described.

What is claimed is:

1. A non-catastrophic, anti-compromise destruct system for thermally destroying critical electrical circuit components sealed within a container comprising:

a. a sealed container for housing circuit components; said circuit components being substantially spaced from the interior walls of said container;

b. a dielectric gas within said sealed container for normally pressurizing said container, said gas having very low toxicity such that leakage would present no hazard;

c. an active metal within said sealed container in a random form having a great amount of space thereabout which is occupied by said dielectric gas and which presents a large surface area to said gas, said metal only partially filling the space surrounding said circuit components between said circuit components and the interior walls of said container;

d. said dielectric gas which occupies substantially all the space about said active metal and in intimate contact therewith including low molecular fluorocarbons for chemically reacting with said active metal upon heat ignition thereof;

e. said active metal being any of magnesium and aluminum;

f. an igniter means within said container to generate the ignition temperature required for initiating the reaction of said gas with said active metal; said igniter means being mounted on an interior wall of said container in contact with said gas and active metal;

g. said gas when reacted with said active metal being converted to any of liquid and solid product, thus minimizing gas evolution from the reaction and which thus reduces any rise in pressure in said sealed container while simultaneously releasing large amounts of thermal energy which help destroy the circuit components contained therein without creating hazards to the sourrounding area.

2. A system as in claim 1 wherein said low molecular fluorocarbons include any of $CF_4$, $CF_6$, $C_2F_6$, $C_3F_8$, $C_4F_8$, $C_4F_{10}$, and $C_6F_{12}$.

3. A system as in claim 1 wherein said active metal is powdered.

4. A system as in claim 1 wherein said active metal is in foil form.

5. A system as in claim 1 wherein said active metal is in wool form.

6. A system as in claim 1 wherein the ignition temperature required for said active metal and said low molecular fluorocarbon gases to chemically react is approximately 800°C.

7. A system as in claim 1 wherein said igniter means is a squib type igniter.

8. A system as in claim 1 wherein said igniter means is a hot wire type igniter.

* * * * *